United States Patent [19]
Katakura

[11] 3,794,964
[45] Feb. 26, 1974

[54] ULTRASONIC IMAGING DEVICE
[75] Inventor: Kageyoshi Katakura, Tokyo, Japan
[73] Assignee: Hitachi, Ltd., Tokyo, Japan
[22] Filed: May 25, 1972
[21] Appl. No.: 256,849

[30] Foreign Application Priority Data
May 30, 1971 Japan.............................. 46/37266
Jan. 12, 1972 Japan................................ 47/5192

[52] U.S. Cl............. 340/1 R, 340/3 FM, 340/5 MP
[51] Int. Cl............................................. G01s 9/66
[58] Field of Search 340/1 R, 3 R, 3 FM, 5 MP, 8 L; 343/14, 17.2 R

[56] References Cited
UNITED STATES PATENTS
3,419,845 12/1968 Thiede et al..................... 340/3 FM
2,528,730 11/1950 Rines.................. 340/5 MP
3,016,513 1/1962 Van Dyke...................... 340/3 FM
3,685,051 8/1972 Wells.................. 340/5 H

*Primary Examiner*—Richard A. Farley
*Attorney, Agent, or Firm*—Craig and Antonelli

[57] ABSTRACT

An ultrasonic imaging device comprising a transmitting transducer which is rectilinearly arranged and which transmits acoustic waves of input signal frequencies to a target object in directions corresponding to said frequencies, an acoustic lens which converges reflected acoustic waves from said target object, and a receiving transducer which is divided in a direction orthogonal to the scanning direction of said acoustic lens, each divided part constituting a receiving element, and which receives the acoustic waves converged by said acoustic lens.

9 Claims, 17 Drawing Figures

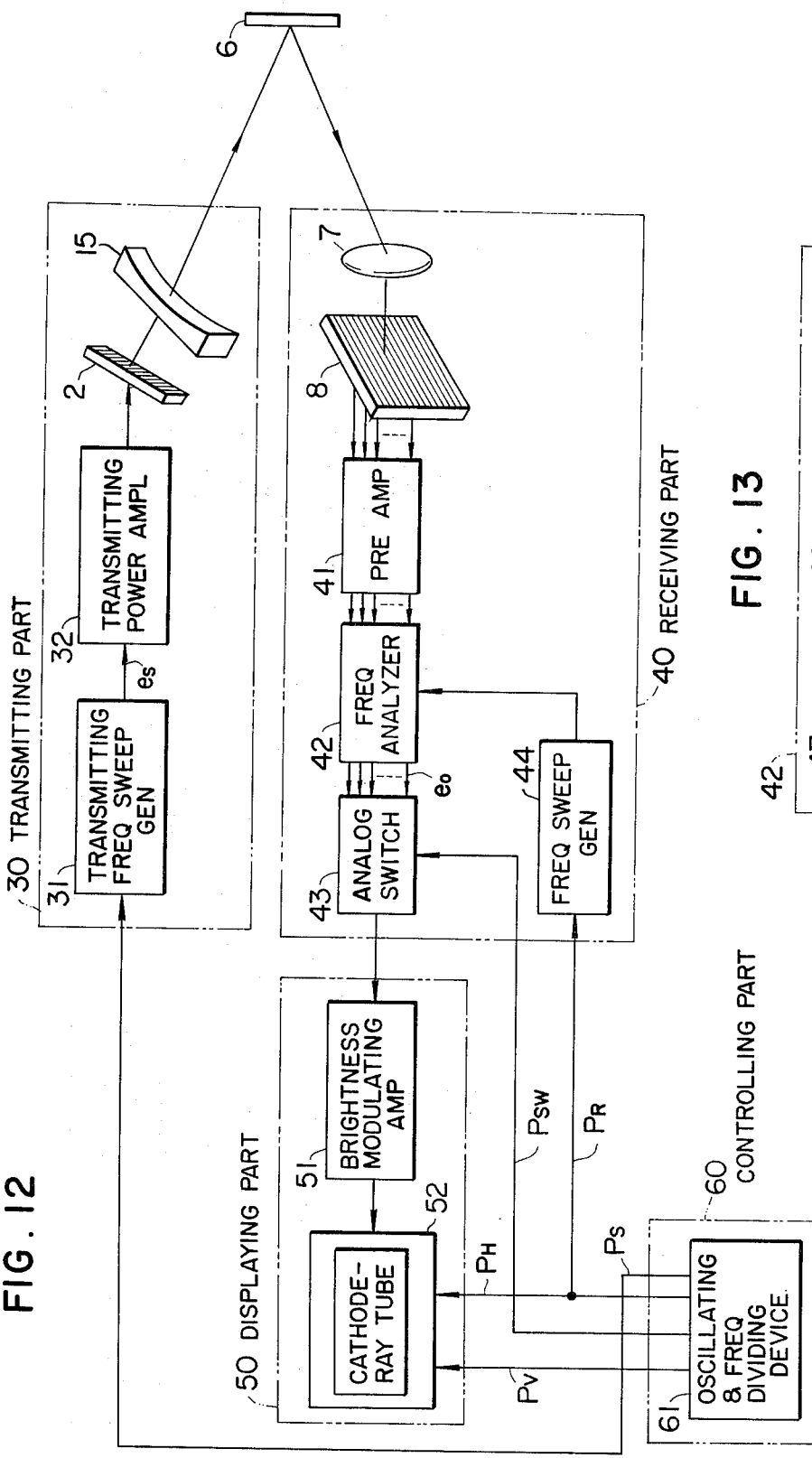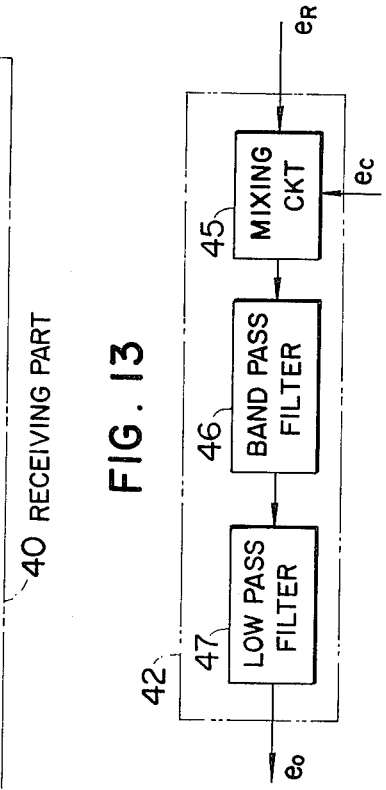

ULTRASONIC IMAGING DEVICE

BACKGROUND OF THE INVENTION:

The present invention relates to an ultrasonic imaging device which, using ultrasonic waves, picks up an object image by reflected ultrasonic waves from an object present in the water, etc.

DESCRIPTION OF THE PRIOR ART:

Among methods of detecting the configuration of a target object in, for example, opaque water, there have heretofore been a type in which ultrasonic waves are radiated from a transmitting transducer, and the waves reflected from the target object are focused into an image onto a receiving transducer consisting of a number of receiving elements arranged in a planar array through an acoustic lens, to thereby obtain an object image. The receiving transducer of another type may consist of a number of receiving elements arranged in a linear array and mechanically displaced, to thereby obtain an object image extending in the form of a plane.

However, in the former case of using the receiving transducer with the receiving elements disposed in a planar array, selecting the position of the receiving elements is difficult, and the device becomes very complicated. In the latter case of rectilinearly arranging the receiving elements and mechanically moving them for scanning, the speed is limited by the mechanical movement, and the imaging speed may not be made high. Thus disadvantages have occurred in the prior art.

As wave transmitting means, there has been employed a method through which the entire area of a target object is irradiated by means of a single transmitting element, and a method in which transmitting elements arranged in a planar array are mechanically displaced to irradiate an object. However, the former has been disadvantageous in that the reflection efficiency is very poor, while the latter has been disadvantageous in that the irradiation speed may not be made high.

SUMMARY OF THE INVENTION:

A principal object of the present invention is to provide an ultrasonic imaging device which is simple in construction and which may carry out high-speed imaging.

Another object of the present invention is to provide a device in which position selection for receiving elements is made easy.

Still another object of the present invention is to provide a device in which the reflection efficiency is excellent.

Yet another object of the present invention is to provide an ultrasonic imaging device which has good range resolution.

In order to accomplish such objects, the present invention is constructed so that ultrasonic waves are radiated from a transmitting transducer which is rectilinearly arranged and which sends out ultrasonic waves of respective input frequencies in directions corresponding to the input frequencies, and that reflected waves from a target object are converged by an acoustic lens and received as an image by a receiving transducer which is divided in a direction orthogonal to the scanning direction of the ultrasonic lens.

BRIEF DESCRIPTION OF THE DRAWINGS:

FIG. 12 is a diagram showing the construction of another embodiment of the ultrasonic imaging device according to the present invention;

FIG. 13 is a diagram showing the practical construction of a frequency analyzer in FIG. 12;

Figure 1:
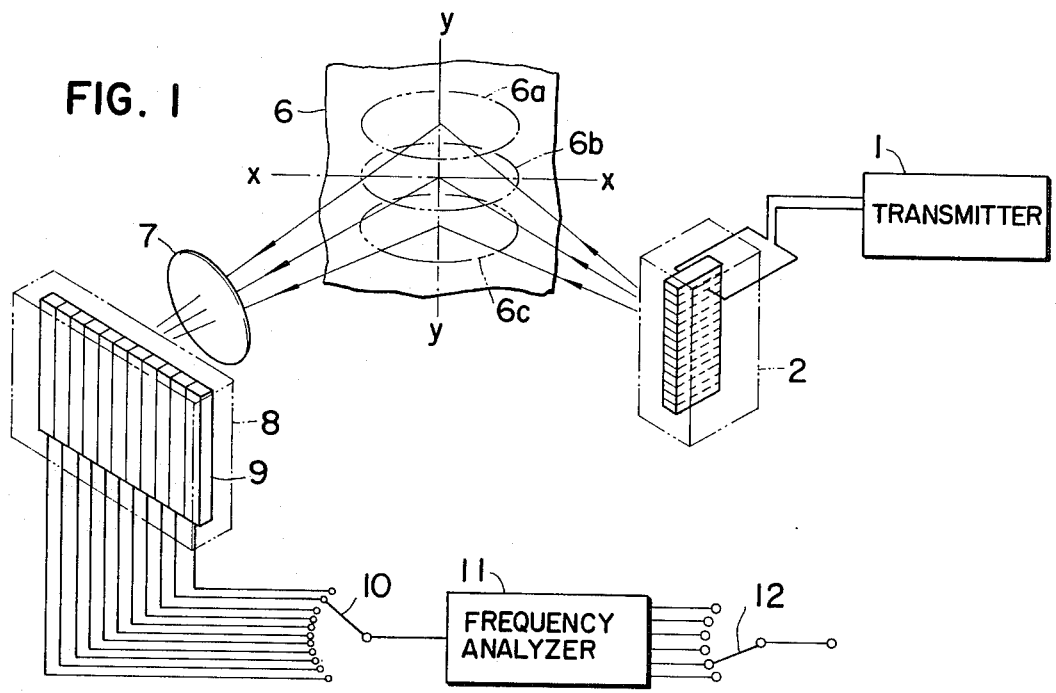
FIG. 1 is a diagram showing the construction of an embodiment of the ultrasonic imaging device according to the present invention.
Figure 2:
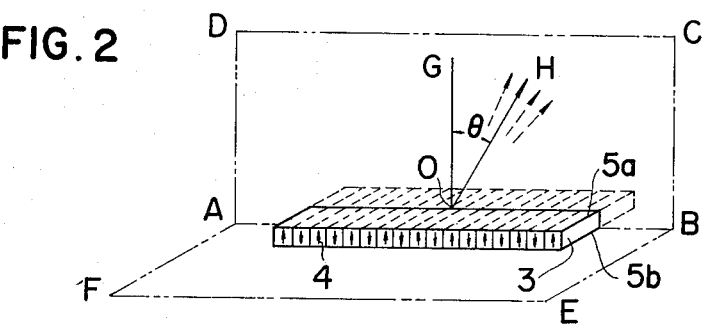
FIG. 2 is a diagram for explaining the construction and operation of a transmitting transducer.

DETAILED DESCRIPTION OF THE INVENTION:

FIG. 1 shows an embodiment of the ultrasonic imaging device according to the present invention, in which numeral 1 designates a transmitter for transmitting signals of various frequencies. Numeral 2 indicates a transmitting transducer which radiates ultrasonic waves in the respectively predetermined directions corresponding to the frequencies of the signals applied from the transmitter 1, and which is constructed as shown in FIG. 2.

More specifically, a number of transmitting elements 3 made of titanium, lead zirconate, etc, are arrayed in the AB-direction. The directions of polarization of the respective transmitting elements are selected so as to be orthogonal to the arrayed direction AB of the transmitting elements and to be alternately polarized as illustrated at arrows 4. Further, common electrodes 5a and 5b are respectively mounted on the upper and lower surface of the transmitting elements. With such a construction, when an input signal is applied from the transmitter 1 to the common electrodes 5a and 5b, acoustic waves are sent out in the ABCD-plane and in the OH direction inclined at an angle $\theta$ with respect to a straight line OG normal to the electrode plane, and the direction OH varies dependent upon the input frequency. For example, when an input having a frequency $f$ is applied from the transmitter 1, acoustic waves having the frequency $f$ are sent out from the transmitting transducer 2 in the direction OH which is determined by the input frequency. As the input frequency $f$ is varied, the angle $\theta$ varies, and the sent-out direction OH of the acoustic waves changes in the ABCD-plane.

Referring again to FIG. 1, numeral 6 designates a target object, 7 an acoustic lens for converging reflected acoustic waves from the target object 6, and 8 a receiving transducer for receiving the acoustic waves converged by the acoustic lens 7. The wave receiving surface of the receiving transducer 8 is divided into a number of elongated parts in a direction orthogonal to the scanning direction of the acoustic waves, and each divided wave-receiving surface constitutes a receiving element 9. Numerals 10 and 12 indicate selecting switches, while numeral 11 is a frequency analyzer.

Figure 3:
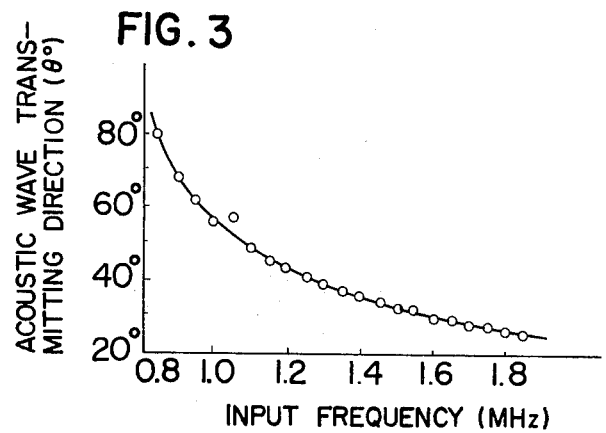
FIG. 3 is a graph showing the relation between the input frequency and the acoustic-wave transmitting direction in the transmitting transducer.

With such a construction, when an input signal is applied from the transmitter 1 to the transmitting transducer 2, acoustic waves are sent out from the transmitting transducer 2 in a direction corresponding to the frequency of the input signal. FIG. 3 is a graph which shows the relation between the input frequency and the acoustic-wave transmitting direction. As can be understood from the graph, the transmitting direction changes with changes in the input frequency. The acoustic waves thus sent out are irradiated on the target object 6. In this case, the acoustic waves of the individual frequencies are irradiated on the $x$-axially elongated surfaces of the target object 6 as at 6a, 6b and 6c, and the irradiated surfaces change in the $y$-axial direction in the order of, e.g. 6a, 6b, 6c with corresponding changes in the frequency. The acoustic waves reflected by the target object 6 are converged by the acoustic lens 7, and are focused into an image on the wave receiving surface of the receiving transducer 8. Accordingly, the position of reflection also changes in the $y$-axial direction, i.e., in the vertical direction on the drawing, in dependence upon the applied frequency in the receiving transducer 8. For this reason, the receiving transducer 8 is divided into a plurality of parts in the $x$-axial direction, i.e., in the horizontal direction, and each divided part consists of the receiving element 9. Outputs of such respective receiving elements 9 are sequentially changed-over by the selection switch 10 and applied to the frequency analyzer 11, where they are subjected to frequency analysis, and outputs, respectively corresponding to the frequencies, are selected and delivered by the selection switch 12. Thus, the output frequency of the transmitter 1 is sequentially changed and the outputs of the frequency analyzer 11 are changed over by the selection switch 12 so as to conduct scanning in the $y$-axial direction, and the outputs of the respective receiving elements are change-over by the selection switch 10 so as to conduct scanning in the $x$-axial direction, whereby outputs for a two-dimensional ultrasonic acoustic image of the target object 6 may be obtained.

Consequently, the selection of the two-dimensional positions of the transmitting elements is unnecessary in the present invention, and the device may be constructed extremely simply. In addition, since images are picked up by the frequency sweep, both the transmitting and receiving transducers need no mechanical scanning, so that the imaging speed may be made sufficiently high. Furthermore, since the $x$-axially elongated surface is irradiated with acoustic waves at a time by means of the transmitting transducer arranged rectilinearly, the reflection efficiency from the target object is very high, and the output of the receiving transducer is increased to that extent.

Figure 4:
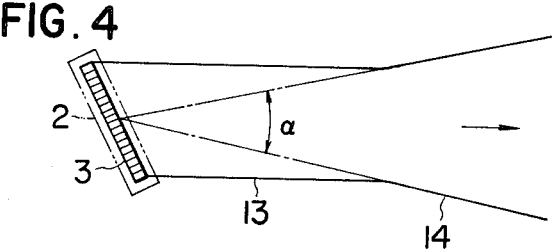
FIG. 4 is a diagram showing the state in which acoustic waves radiated from the transmitting transducer are spread.

While the foregoing is satisfactorily applicable to cases where the target object is comparatively distant, it is not necessarily applicable, as illustrated in FIG. 4, in the case where the target object is at a short distance.

More specifically, acoustic waves of a certain frequency radiated from the transmitting transducer 2 travel in the form of plane waves 13 for a while, and gradually become spherical waves 14. Therefore, although the directional angle $\alpha$ as viewed from the transmitting transducer 2 is small and the bearing resolution is high for the distant target object, the directional angle $\alpha$ increases and the bearing resolution decreases for an object disposed a short distance away.

Figure 5:
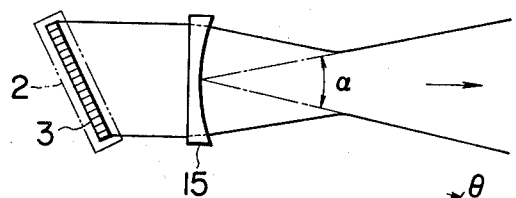
FIG. 5 is a diagram showing an example in which an acoustic lens is jointly used for the transmitting transducer.

Therefore, as shown in FIG. 5, an acoustic lens 15 is provided in front of the transmitting transducer 2 so as to focus acoustic waves radiated from the transmitting transducer. Thus, an equivalent resolution to that of the distant case may also be obtained for the object at a short distance.

Figure 6:
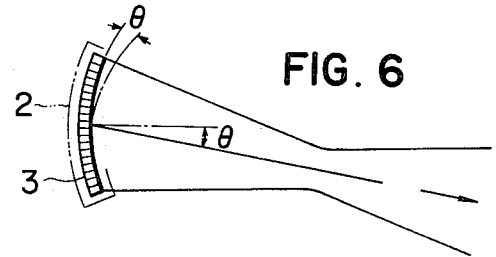
FIG. 6 is a diagram showing an example in which the transmitting transducer is curved.

The directional angle may also be made small in such a way that, as shown in FIG. 6, the transmitting transducer 2 itself is arranged in a curved form to thereby focus the acoustic waves.

In the foregoing embodiments, it has been assumed that all the acoustic waves sent out from the transmitting transducer are of one frequency component, that the frequency is successively varied, and that the direction of the transmission from the transmitting transducer is also varied in succession by the frequency, so as to scan a target. It is also possible, however, that a noise frequency input containing a number of frequency components is applied to arrayed transmitting transducers instead of making the input frequency of the transmitting transducer one frequency component, whereby acoustic waves of frequencies respectively corresponding to various directions are simultaneously sent out. When the noise frequency input of frequency components in a frequency range capable of covering a required field of view is applied to the arrayed transmitting transducers, acoustic waves in the above-mentioned frequency range are simultaneously transmitted over the entire area of the required field of view. Reflected waves of the respectively different frequencies are focused on the receiving transducer from various parts of the target object, and a two-dimensional acoustic image is formed on the wave receiving surface.

In order to thus obtain the acoustic image, a device quite similar to that in FIG. 1 may be used.

On the other hand, if a frequency analyzer is provided for every receiving element in place of the single frequency analyzer 11 in FIG. 1, so as to simultaneously subject the outputs of the respective receiving elements to the frequency analysis and to thereby obtain the outputs of the respective frequencies, then the images of arbitrary positions of the target object will advantageously be immediately obtained.

In that case, the selector switch 10 is omitted.

Now, numerical values of an embodiment of the device according to the present invention will be discussed in connection with FIG. 7.

In this case, the transmitting elements 3 each being about 1 mm wide and about 0.9 mm thick are arranged in a straight line to constitute the transmitting transducer 2 being about 15cm long. In front of the transmitting transducer 2, acoustic lens 15 is disposed one side of which is about 30cm long and the focal distance is about 50cm. Acoustic waves are irradiated on a target object which is about 50cm from the acoustic lens 15. It is assumed that the frequencies at this time are of a single sinusoidal wave in a frequency range from about 1 MHz to 1.5MHz, while the output of the transmitter is approximately 1W.

Figure 7:
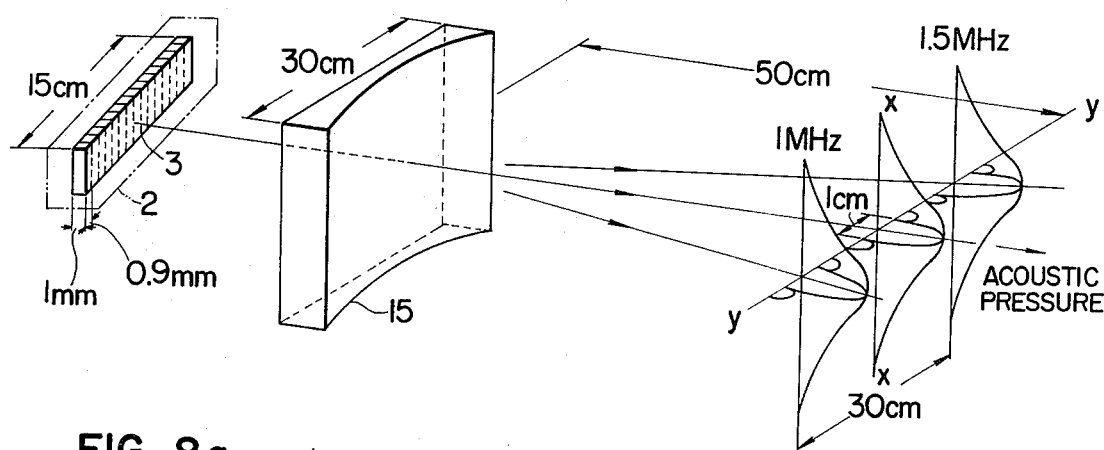
FIG. 7 is a diagram showing concrete numerical values of various parts of an embodiment of the present invention.
Figure 8A:
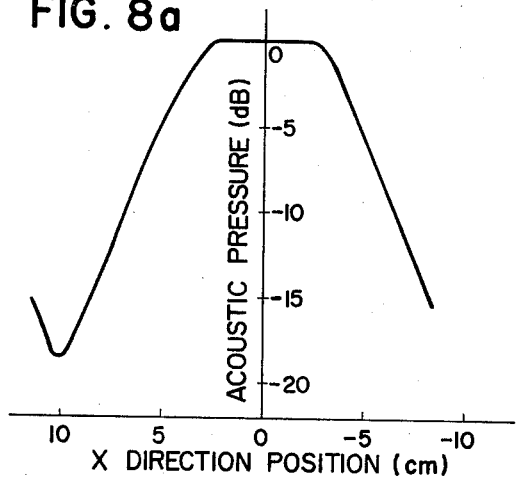
FIGS. 8a and 8b are diagrams respectively showing the relationships between the positions in the x-axial and y-axial directions on the surface of a target object and acoustic pressure.
Figure 8B:
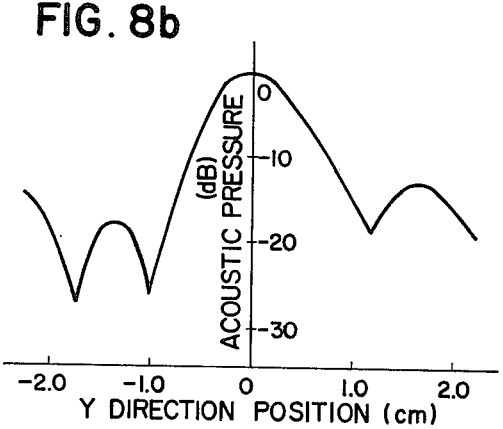

The directional characteristics of the acoustic pressure of the acoustic waves irradiated on the target object, in this way, roughly have the relationship shown on the right side in FIG. 7, and concretely are as shown in FIGS. 8a and 8b. More specifically, FIGS. 8a and 8b illustrate acoustic pressures in the x-axial and y-axial directions of the target object when signals of the frequency 1MHz are irradiated. It is understood from the diagrams that the radiated acoustic waves have directivities to specific positions as correspond to the frequency.

In case where noise frequency inputs containing a number of frequency components as have been previously stated are simultaneously transmitted, directional characteristics quite similar to those in FIGS. 8a and 8b may also be obtained.

Since the foregoing embodiments have no range resolution, it is feared that scattered acoustic waves from air bubbles etc. being much existent in the water are simultaneously received as jamming waves, to render an image unclear.

Description will be hereunder made of another embodiment of the present invention in which such a disadvantage is eliminated and range resolution is provided.

Figure 9:
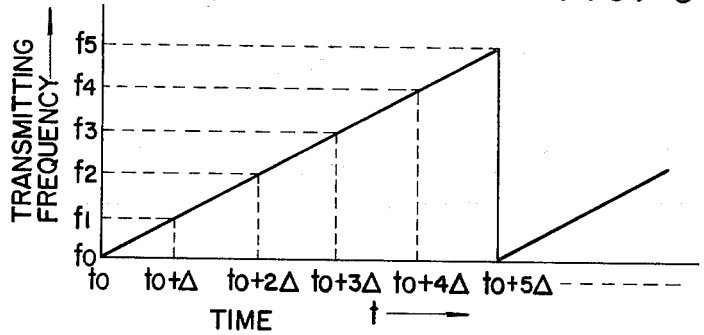
FIG. 9 is a diagram showing an example of changes-versus time of the transmission frequency.

In the present invention, frequency-swept acoustic waves having their frequency varied with time are sent out from the transmitting transducer. Now, let us consider a case where the relation between the transmission frequencies of the frequency-swept acoustic waves and time is repeatedly changed, as shown in FIG. 9, in the form of saw-tooth waves from a frequency $f_0$ to a frequency $f_5$ with the lapse of time $t$.

Figure 10:
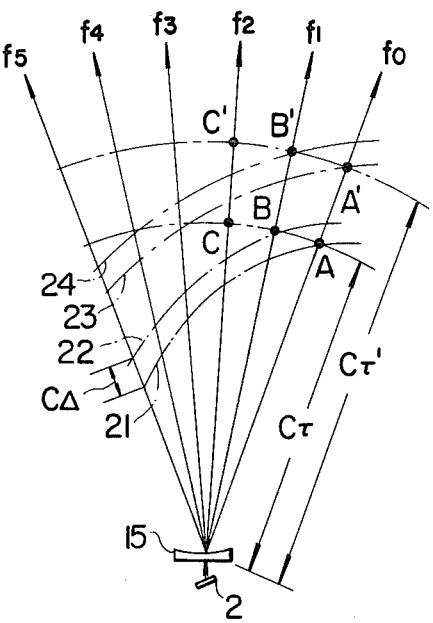
FIG. 10 is a diagram for explaining changes-versus-time of the wave front positions of the transmitted acoustic waves.

In this case, as the time proceeds from $t_0$ via $t_0 + \Delta$, $t_0 + 2\Delta$, .... to $t_0 + 5\Delta$, the transmission frequency varies from $f_0$ via $f_1, f_2, \ldots$ to $f_5$. The state in which such frequency-swept acoustic waves are sent out from the transmitting transducer is as illustrated in FIG. 10. Since the distance between the transmitting transducer 2 and the acoustic lens 15 for the wave transmission is almost negligible, the acoustic waves sequentially vary the transmitted direction about the acoustic lens 15 and in correspondence with the frequencies with the lapse of time, and are sent out in directions respectively determined by the frequencies $f_0 \rightarrow f_1 \rightarrow f_2 \ldots \rightarrow f_5$. In the figure, C signifies the propagation velocity of the acoustic waves in the water.

The position of a wave front after the acoustic waves of the frequency $f_0$ have been thus transmitted, that is, at time $t = t_0 + \tau$ is shown by a curve 21 in the figure. As apparent from the curve, an object which, by way of example, is located in the transmission direction of the acoustic waves of the frequency $f_0$ and exists at point A on the curve 21 is subjected to the acoustic-wave irradiation of the frequency $f_0$ and sends out reflected waves at the time $t = t_0 + \tau$. A propagation period of time required for the reflected waves to reach the wave receiving surface of the receiving transducer (not shown) placed in the vicinity of the transmitting transducer 2 is $\tau$, so that the reflected waves of the frequency $f_0$ from the point A are received at time:

$$t = (t_0 + \tau) + \tau = t_0 + 2\tau$$

Letting the position of a wave front at time $t = t_0 + \tau + \Delta$ be represented by a curve 22, an acoustic wave at the frequency $f_1$ impinges upon point B at $t = t_0 + \tau + \Delta$, this point being located in the transmitted direction of the acoustic waves of frequency $f_1$ and on the curve 22. Reflected waves reach the wave receiving surface of the receiving transducer at time:

$$t = t_0 + 2\tau + \Delta$$

As apparent from FIG. 9, $\Delta$ signifies the period of time in which the transmission frequency varies from $f_0$ to $f_1$.

Similarly, among waves reflected from an object which is located at a distance $C\tau$ from the position of the transmitting transducer, those of the frequency $f_n$ (where $n = 0, 1, 2, \ldots \ldots 5$) are received at time $t = t_0 + 2\tau + n\Delta$. Letting the wave-front positions of the acoustic waves at times $t_0 + \tau'$ and $t_0 + \tau' + \Delta$ be represented by curves 23 and 24, waves reflected from objects A', B', C', . . . . . . located at a distance C' from the transmitting acoustic lens 15 are received as signals of the frequency $f_n$ at times $t = t_0 + 2\tau' + n\Delta$.

Figure 11:
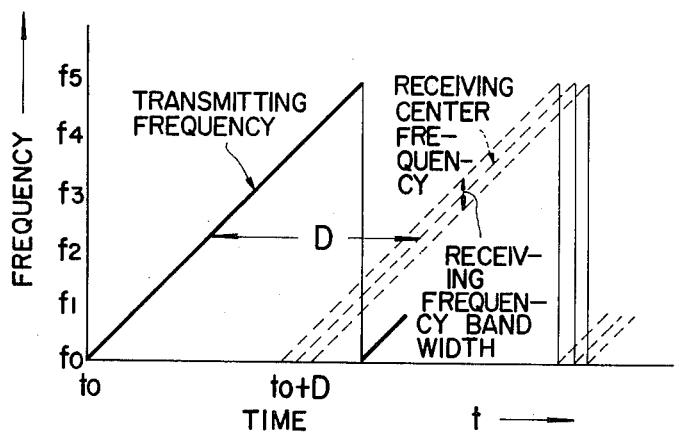
FIG. 11 is a diagram showing the relation between changes-versus-time of the transmission frequency and the reception frequency.

In this manner, reflected waves from objects being at respectively different distances from the transmitting acoustic lens 15 are obtained in the form of signals which differ in time and frequency. Outputs corresponding to the reflected waves from the objects on planes respectively being at distances corresponding to various delay times may therefore be separated and derived in such way that, as illustrated in FIG. 11, the center reception frequency of the receiver as shown by the dotted line is varied similarly to the transmission frequency shown by the solid line, but with a delay of a period of time D, and that the delay time D is further varied. While the foregoing is a description of the single receiving element with the divided wave-receiving surfaces, it is to be understood that a two-dimensional image pickup having range resolution may also be carried out by approximately disposing each receiving element.

Considering that the frequency is determined in correspondence with a bearing and that the delay time is determined in correspondence with a distance to a target plane, it is to be understood that the image pickup of an arbitrary plane is possible by suitably selecting the delay time D of the center reception frequency in FIG. 11.

Next description will be made of a practical device to be used therefor. FIG. 12 is a block diagram showing an embodiment of the device according to the present invention, which is composed of a transmitting part 30, a receiving part 40, a display part 50 and a control part 60.

In the transmitting part 30, reference numeral 31 designates a frequency-swept wave generator for wave generation, while 32 is a power amplifier for wave transmission. In the receiving part 40, reference numeral 41 indicates a pre-amplifier, 42 a frequency analyzer, 43 an analog switch, and 44 a frequency-swept wave generator. In the receiving section 50, reference numeral 51 represents an amplifier for brillance modulation, while 52 is a Braun tube. In the control part 60, reference numeral 61 shows an oscillator and frequency divider.

Parts 2, 6, 7, 8 and 15 are the same as those of identical numerals shown in FIG. 1 and FIG. 5.

With such construction, the transmitting frequency-swept wave generator 31 of the transmitting part 30 is driven by sweep synchronizing pulses $P_s$ having a period $T_s$ as sent out from the oscillator and frequency divider 61 of the control part 60. Thus, a frequency-swept signal $e_s$ having a period $T_s$ and a frequency range $f_{SL} - f_{SH}$ is obtained. It is amplified by the transmitting power amplifier 32, and is applied to the transmitting transducer 2. Acoustic waves sent out from the transmitting transducer 2 permeate through and are converged by the transmitting acoustic lens 15 to be irradiated on the target plane 6.

Waves reflected from an object at the target plane 6 are converged by the receiving acoustic lens 7, and are focused into an image on the wave receiving surface of the receiving transducer 8. Outputs of the respective receiving elements generated thereby are amplified by the pre-amplifier 41 in the receiving section 40. An output signal $e_R$ of the pre-amplifier 41 is applied to the frequency anaylzer 42.

FIG. 13 illustrates the construction of the frequency analyzer 42 corresponding to one channel. It comprises a mixing circuit 45, a band-pass filter 46 and a low-pass filter 47.

The output signal $e_R$ has its frequency converted by a frequency-swept carrier signal $e_C$ in the mixing circuit 45, only a predetermined band-width component is selected and passed by the band-pass filter 46, and only a lower frequency component is passed by the low-pass filter 47. The envelope wave component thus obtained is derived as an output signal $e_0$ of the frequency analyzer 42.

Herein, the frequency-swept carrier signal $e_C$ is obtained by driving the frequency-swept wave generator 44 by sweep synchronizing pulses $P_R$ which are delayed by a delay time D with respect to the sweep synchronizing pulses $P_s$. It is a frequency-swept signal having a period $T_s$ and having a frequency range $f_{RL}$ to $f_{RH}$. Between the frequencies of the previously-mentioned frequency-swept signal $e_s$ and the above-mentioned frequency-swept carrier signal $e_C$, there is the following relation:

$$f_{RL} - f_{SL} = f_{RH} - f_{SH} = f_0$$

The center frequency of the band-pass filter 46 of the frequency analyzer 42 is made the frequency difference $f_0$, whereby waves reflected from a distance corresponding to the delay time D may be derived.

Subsequently, the outputs of the frequency analyzer 42 are changed-over by the analog switch 43. The output thereof is amplified and brightness modulated by the amplifier 51 for brightness modulation. Further, the deflecting means (not shown) of the Braun tube 52 are driven by horizintal synchronizing pulses $P_H$ at a period $T_H$ and and vertical synchronizing pulses $P_V$ at a period $T_V$. Thus, the object image is displayed in the form of brilliance or brightness changes of scanning lines in the vertical direction of the Braun tube 52.

Figure 14:
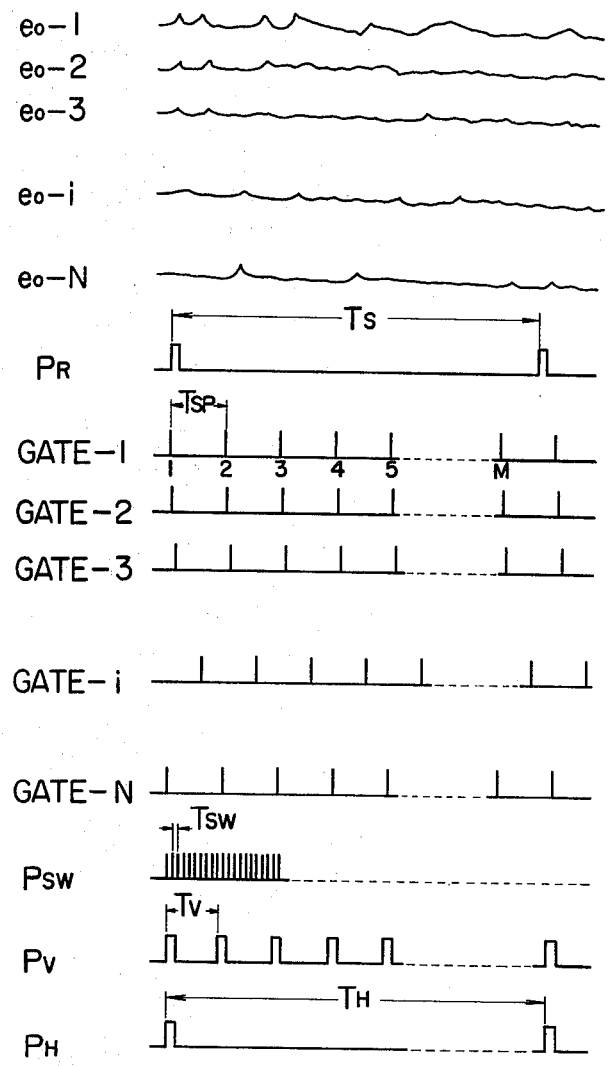
FIG. 14 is a time chart of signals at various parts in FIG. 12.

This state is as illustrated in a time chart in FIG. 14 where $e_0 - i$ designates the output of a channel $i$ of the frequency analyzer, while GATE $- i$ indicates sampling pulses of the frequency analyzer output $e_0 - i$ of the channel $i$. Reference character N signifies the number of the divisions of the wave receiving surface, namely, the number of receiving elements. In the analog switch 43, the sampling number of each analyzer output within one sweep period $T_s$ is assumed to be M. The sampling period $T_{sp}$ of the analyzer output $e_0$, accordingly, becomes:

$$T_{sp} = T_s/M$$

In the analog switch 43, in order to change-over N channels within one sampling period, i.e., $T_{sp}$, the change-over period $T_{sw}$ of analog switch control pulses $P_{sw}$ is:

$$T_{sw} = T_{sp}/N = T_s/(M \times N)$$

The vertical synchronization period $T_V$ in the display part 50 has the relationship $T_V = T_{sp}$. The period $T_H$ of the horizontal synchronizing pulses $P_H$ in the display section has the relationship $T_H = T_s$, while their phase is equal to that of the sweep synchronizing pulses $P_R$. The number of frames $F_N$ has the relation of $F_N = 1/T_s$.

Further, with the method as will now be explained, the timing relation between the sweep synchronizing pulses $P_s$ and the sweep synchronizing pulses $P_R$ delayed by the period of time D over the former, or the delay time D, is varied, whereby the image of reflected waves from an optical distance is brilliance-modulated and displayed on the Braun tube at the number of frames $F_N$.

Figure 15:
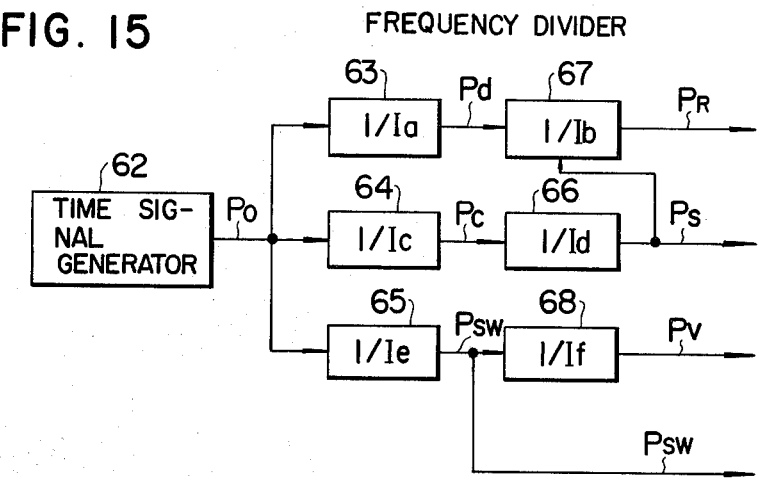
FIG. 15 is a diagram showing the practical construction of a control section in FIG. 12.
Figure 16:
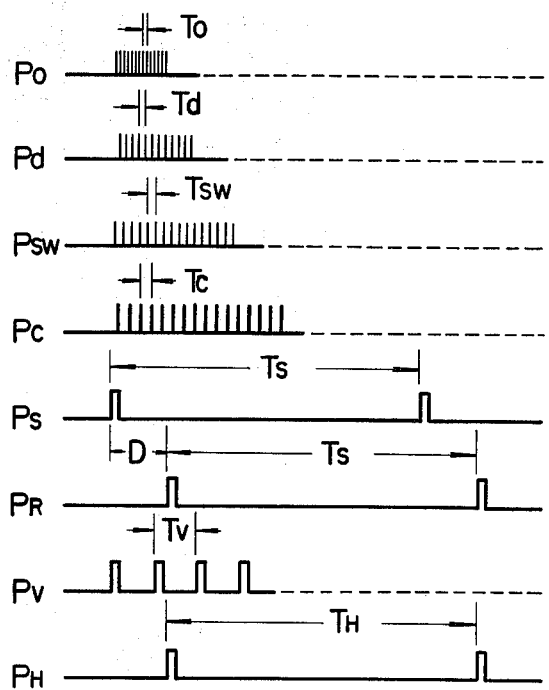
FIG. 16 is a time chart of signals at various parts in FIG. 15.

FIG. 15 shows details of the oscillator and frequency divider 61 constituting the control section 60, while the corresponding time chart is depicted in FIG. 16. An output signal $P_o$ (period : $T_o$) of timing signal generator 62 in the oscillator and frequency divider 61 are subjected to frequency divisions by means of frequency divider 63 (frequency division ratio : $I_a$), frequency divider 64 (frequency division ratio : $I_c$) and frequency divider 65 (frequency division ratio $I_e$), so as to respectively obtain clock pulses for-the-time delay $P_d$ having a period $T_d$ ($T_d = T_o \times I_a$), clock pulses for the sweep-synchronizing — signal $P_c$ having a period $T_c$ ($T_c = T_o \times I_c$) and analog switch control pulses $P_{sw}$ having a period $T_{sw}$ ($T_{sw} = T_o \times I_e$).

Subsequently, the sweep-synchronizing-signal clock pulses $P_c$ (period : $T_c$) are subjected to frequency division by means of frequency divider 66 (frequency division ratio : $I_d$), to thereby obtain the sweep synchronizing pulses $P_s$ having a period $T_s$ ($T_s = T_c \times I_d$). A frequency divider 67 (frequency division ratio: $I_b$) is started with the sweep synchronizing pulses $P_s$, so as to divide the period $T_d$ of the time-delay clock pulses $P_d$ and to thereby obtain the sweep synchronizing pulses $P_R$ which have a period $T_s$ and which are delayed by D ($D = T_d \times I_b$) over the sweep synchronizing pulses $P_s$.

The analog switch control pulses $P_{sw}$ (period : $T_{sw}$) are subjected to frequency division by means of a frequency divider 68 (frequency division ratio : $I_f$), to obtain the display-section synchronizing signal $P_V$ (period : $T_V = T_{sw} \times I_f$).

The horizontal synchronizing pulses $P_H$ are obtained from the sweep synchronizing pulses $P_R$.

With the imaging device of the foregoing construction, it becomes possible to pick out and image only an object present at a distance aimed at, and it is possible to sharply lower the jamming output. According to experiments, a range resolution of 10cm could be obtained with the device of the above embodiment.

While, with reference to FIG. 12, description has been made of the embodiment of providing the transmitting acoustic lens 15, it need not be especially provided in case where the target object is distant. While, in the above embodiment, description has been made of the case of displaying the received acoustic waves on the Braun tube, it may be replaced with other recording means.

I claim:
1. An ultrasonic imaging system comprising:
   a transmitter which transmits an output of various frequency components;
   a band-shaped transmitting transducer which comprises a number of transmitting elements arrayed in a predetermined direction, the directions of polarization of the respective transmitting elements being selected so as to be orthogonal to the arrayed direction and to be polarized in a direction opposite to that of adjacent transmitting elements, and common electrodes mounted on both surfaces of said transmitting elements orthogonal to the polarization directions for applying the output of said transmitter thereto, and which transducer radiates ultrasonic waves at input frequencies from said transmitter in directions corresponding to said input frequencies, to scan a target object;
   an acoustic lens for wave reception which converges said ultrasonic waves received from said target object;
   a receiving transducer which is divided into a plurality of receiving elements in a direction orthogonal to the scanning direction of said ultrasonic waves and on which said ultrasonic waves from said acoustic lens are focused into an image; and
   a receiver which subjects the outputs of said respective receiving elements of said receiving transducer to frequency analysis and which detects the respective frequency outputs.

2. An ultrasonic imaging system according to claim 1, further comprising an acoustic lens for wave transmission which converges said acoustic waves from said transmitting transducer, to irradiate them on said target object.

3. An ultrasonic imaging system according to claim 1, wherein said receiver comprises a first selector switch which selects said outputs of said respective receiving elements, a frequency analyzer which subjects the outputs which have been selected by said selector switch to frequency analysis and a second selector switch which selects the respective frequency outputs of said frequency analuzer.

4. An ultrasonic imaging system according to claim 1, wherein said receiver comprises frequency analyzers which are provided in correspondence with said outputs of said respective receiving elements and which subjects said outputs of said receiving elements to frequency analyses, and a selector switch which selects the respective frequency outputs of said respective frequency analyzers.

5. An ultrasonic imaging system according to claim 1, wherein said transmitting transducer is curved towards said target object.

6. An ultrasonic imaging system comprising:
   a transmitter which transmits an output varying in frequency with the lapse of time;
   a band-shaped transmitting transducer which comprises a number of transmitting elements arrayed in a predetermined direction, the directions of polarization of the respective transmitting elements being selected so as to be orthogonal to the arrayed direction and to be polarized in a direction opposite to that of adjacent transmitting elements, and common electrodes mounted on both surfaces of said transmitting elements orthogonal to the polarization directions for applying the output of said transmitter thereto, and which transducer radiates ultrasonic waves at input frequencies from said transmitter in directions corresponding to said input frequencies, to scan a target object;
   an acoustic lens for wave reception which converges and ultrasonic waves received from said target object;
   a receiving transducer which is divided into a plurality of receiving elements in a direction orthogonal to the scanning direction of said ultrasonic waves and on which said ultrasonic waves from said acoustic lens are focused into an image; and
   a receiver which detects the respective frequency components from said respective receiving elements and which selects, among said frequency components, only components corresponding to the respective frequencies when the variations-versus-time of the output frequencies of said transmitter are delayed by a predetermined period of time.

7. An ultrasonic imaging system according to claim 6, further comprising an acoustic lens for wave transmission which converges said acoustic waves from said transmitting transducer, to irradiate them on said target object.

8. An ultrasonic imaging system adcording to claim 6, wherein said receiver comprises a frequency sweep generator which generates frequency signals having a fixed frequency difference from said output frequency from said transmitter and with said variations-versus-time of said output frequency delayed by said predetermined period of time, a mixer circuit which subjects the outputs of said respective receiving elements to frequency conversion by said signals from said frequency sweep generator, a filter which derives a predetermined band component of an output of said mixer circuit, and an analog switch which selects the outputs of said filter.

9. An ultrasonic imaging system according to claim 6, further comprising display means which displays the outputs of said receiver.

* * * * *